(No Model.)
J. M. DYER.
WAVE POWER.
No. 597,552.  Patented Jan. 18, 1898.
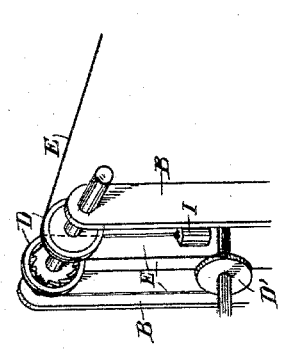
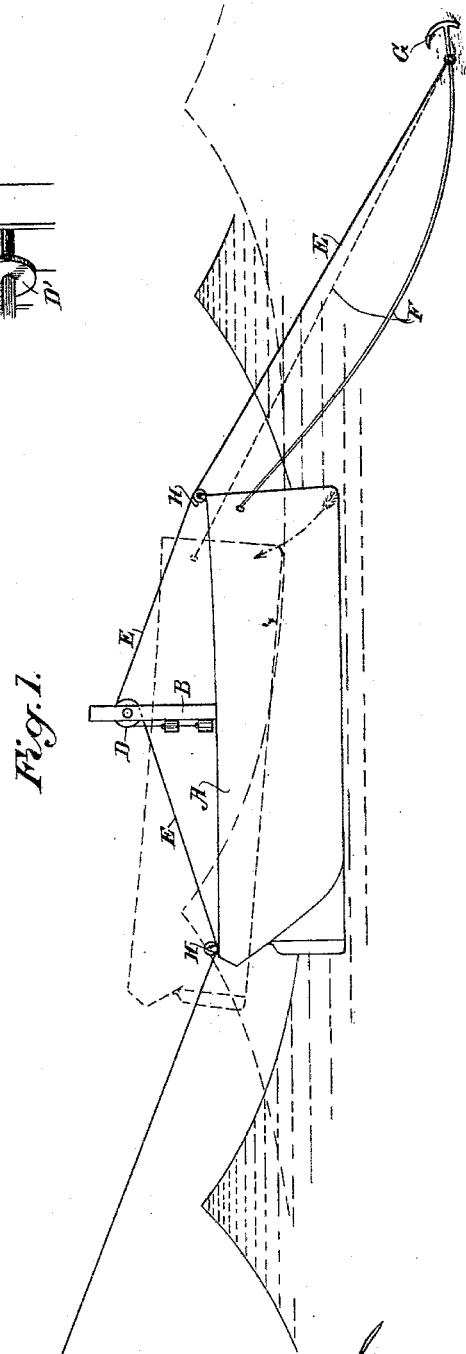
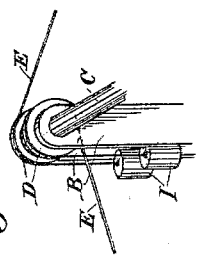
Witnesses,
Inventor,
James M. Dyer

UNITED STATES PATENT OFFICE.

JAMES M. DYER, OF SAN FRANCISCO, CALIFORNIA.

WAVE-POWER.

SPECIFICATION forming part of Letters Patent No. 597,552, dated January 18, 1898.

Application filed April 10, 1897. Serial No. 631,492. (No model.)

*To all whom it may concern:*

Be it known that I, JAMES M. DYER, a citizen of the United States, residing in the city and county of San Francisco, State of California, have invented an Improvement in Wave-Powers; and I hereby declare the following to be a full, clear, and exact description of the same.

My invention relates to a mechanism for utilizing the power produced by the rising and falling of a vessel or float upon the waves.

It consists of a vessel or float having suitable mechanism mounted upon it, means for anchoring the vessel to a fixed point, which serves as a fulcrum about which it rises and falls, and a second rope or cable so connected with the anchoring-cable or fixed point that the alternate slacking and extension of the anchoring-cable will transmit motion through said rope to the mechanism upon the vessel.

It also consists in details of construction which will be more fully described by reference to the accompanying drawings, in which—

Figure 1 is a view of my device, showing it anchored or connected with a fixed point from either end. Fig. 2 is a detail of the power-transmitting device. Fig. 3 is a modification of the same.

The object of my present invention is to provide a means for converting the rising and falling and oscillating motion of a vessel or float into direct power, which may be utilized upon the float or vessel itself independent of outside connections.

In the present drawings, A is a vessel or float of any description having a framework or standards B mounted upon it at any convenient or suitable point, or, if desired, the masts or regular fixtures of the vessel may be employed to support the necessary mechanism. This mechanism, as here shown, consists of a shaft C, having a pulley or pulleys D, with suitable ratchet mechanism intervening between the pulleys and the shaft, so that the shaft will be allowed to rotate freely in one direction by the disengagement of the pawls and will be caused to rotate in the opposite direction by the engagement of the pawls when tension is brought upon the pulleys through the connecting-ropes E, which pass over the pulleys, as shown.

The vessel or float may be anchored by a cable F to a fixed anchor or point of support G. The peculiar action of the waves upon a vessel or float thus anchored is to raise the float as the wave or swell passes under it, and by reason of the forward movement the vessel will be caused to swing away from its anchor, so as to draw the cable F approximately taut. The reflex or return movement of the wave or swell allows the float or vessel to sink, and at the same time it is carried outwardly toward its fixed anchorage, so as to produce a slack in the anchoring-cable F, and this alternate tightening and slackening of the cable takes place with each movement of the swell. I have taken advantage of this peculiar movement by connecting the rope E with the cable F at some point between the vessel and the anchor or directly to the anchor, as at present shown.

The rope may pass over a guiding-pulley, as shown at H, and thence over the pulley D, having a weight suspended upon its lower end, which keeps it tight at all times independent of the slackening and straightening of the cable. In the present case a rope E may also pass over a similar pulley at the opposite end of the vessel and be connected with a stationary point—such as a pile or wharf, rock, or other convenient point—and the two ropes may be made to act alternately upon pulleys which are mounted upon the same shaft C and have clutch mechanisms whereby one of the pulleys will be temporarily connected to rotate the shaft in one direction when the anchor-cable is being tightened and the other will be adapted to engage the shaft, so that its weight will operate it in the same direction as the vessel sinks, thus producing an approximately continuous rotary motion of the shaft upon which the pulleys are mounted.

In some cases it may be found desirable to pass the single rope around one of the pulleys D, thence around a fixed direction-pulley D', thence upward and over the second pulley D, and to have the end connected with a weight I, which continually takes up the slack of the rope E and keeps it taut, thus allowing it to render back and forth over the driving-pulleys D and produce the required motion of the shaft. It will be understood that the power thus derived may be applied in various ways, such as compressing air into suitable reservoirs, which air may be afterward utilized through a proper engine to drive a propeller, or the apparatus may be connected with a pump, which will act to keep the vessel free of any water in case of leakage, the operation in this case being essentially automatic and needing no attention.

Having thus described my invention, what I claim as new, and desire to secure by Letters Patent, is—

1. In combination with a vessel or float with a fixed point of anchorage, a cable connecting said anchor with the vessel so that it may be alternately straightened and slackened by the rise and fall of the vessel on the waves, a rope fixed to the cable at or near its connection with the anchor, passing thence over pulleys upon a shaft mounted upon the vessel and having a weight connecting with its opposite end whereby it is kept taut and allowed to move over the pulleys, a shaft and ratchet mechanism by which the pulleys are allowed to turn freely when the rope moves in one direction and are caused to engage with the shaft when the rope acts in the opposite direction.

2. A wave-power device consisting of a vessel or float with a fixed point of anchorage, a cable or line connecting said anchor with the vessel or float so that it may be alternately straightened and slackened by the rise and fall of the vessel or float on the waves, a connection from the cable at or near where the latter connects with the anchor, having weights suspended from it, and a shaft and mechanism operated by said connection during the rising and falling motions of the vessel or float.

In witness whereof I have hereunto set my hand.

JAMES M. DYER.

Witnesses:
S. H. NOURSE,
JESSIE C. BRODIE.